United States Patent [19]
Sonolet

[11] 3,743,332
[45] July 3, 1973

[54] ASSEMBLING OF TUBULAR ELEMENTS
[76] Inventor: Henri Claude Sonolet, 32, Rue des Renaudes, Paris, France
[22] Filed: May 17, 1971
[21] Appl. No.: 144,180

[52] U.S. Cl............... 287/54 A, 287/124, 287/126, 52/726, 52/665, 52/656, 287/189.36 H
[51] Int. Cl.............................................. F16b 7/04
[58] Field of Search................. 160/381; 287/54 A, 287/54 C, 126, 189.36 H, 54 B, 56, 124, 115, 2; 52/726, 665, 285, 656; 135/3 R, 15 PO

[56] References Cited
UNITED STATES PATENTS
| | | | |
|---|---|---|---|
| 3,021,159 | 2/1962 | Baek | 287/54 A |
| 1,322,801 | 11/1919 | Lewis | 287/54 C |
| 1,354,549 | 10/1920 | Gilmer | 287/127 R |
| 1,860,866 | 5/1932 | Marshall | 287/2 |
| 3,057,024 | 10/1962 | Doremus | 287/20.92 B |
| 3,345,095 | 10/1967 | Hohenberger | 287/127 R |

Primary Examiner—David J. Williamowsky
Assistant Examiner—Wayne L. Shedd
Attorney—Young & Thompson

[57] ABSTRACT

This invention relates to a tube joining element comprising a support having therein mounting means transverse to the axis of its associated tube, and an arm member with retaining edges pivotally supported by said mounting means, whereby, when said support is inserted into a tube said retaining edges are pressed by lever action of said arm against the internal surface of said tube to hold the tube joining element in said tube.

12 Claims, 4 Drawing Figures

PATENTED JUL 3 1973
3,743,332
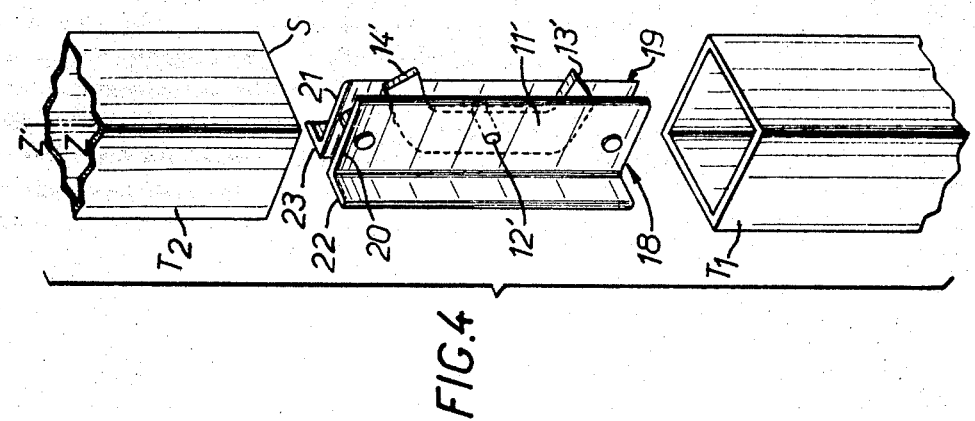
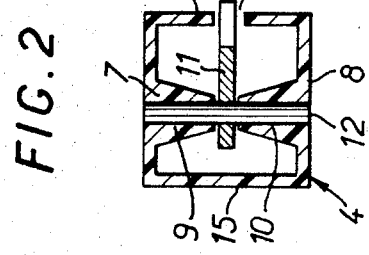
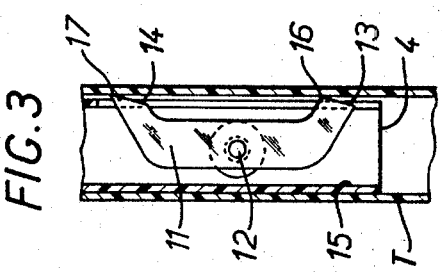
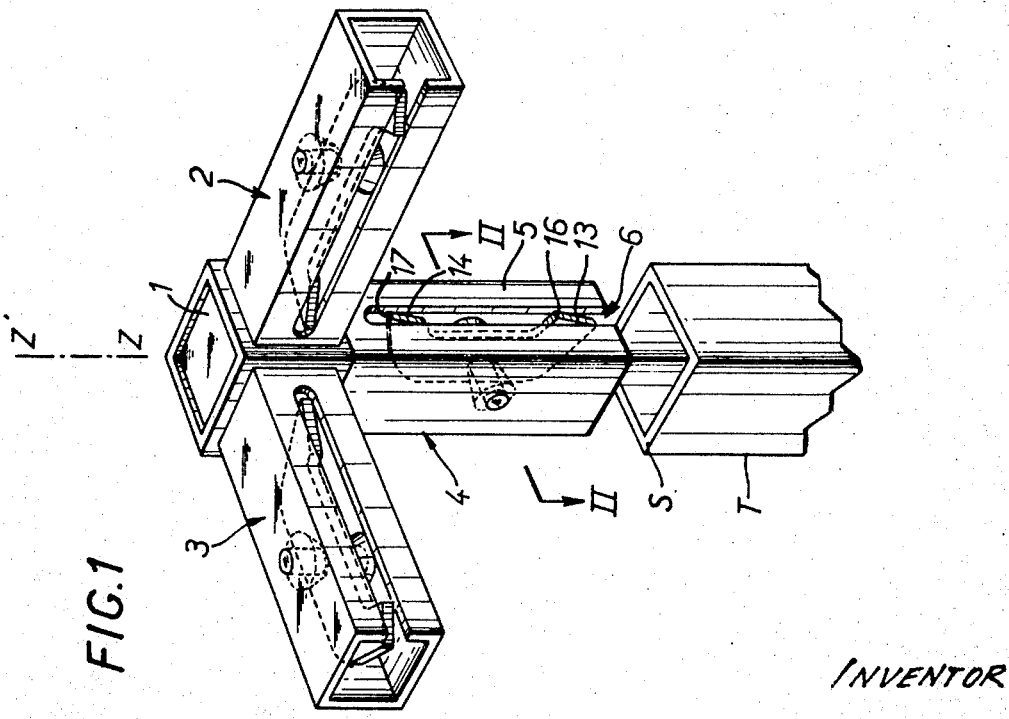
INVENTOR
HENRI CLAUDE SONOLET
BY Young & Thompson
ATTYS.

ASSEMBLING OF TUBULAR ELEMENTS

FIELD OF THE INVENTION

The present invention relates generally to tube-joining elements. In particular the invention relates to elements for joining two or more tubes in the production of articles of furniture.

DISCUSSION OF PRIOR ART

It has been proposed to connect tubes together by pins or rivets. It has also been proposed to connect tubes by hammering, crimping, welding or the like. These methods can leave visible signs of the assembly operation and often need specialized equipment. These proposed connections are often unsuitable for use in articles of furniture as they are unsightly or have projections which may catch on a users clothes.

OBJECTS OF THE INVENTION

It is an object of this invention to provide a joining element which is suitable for use in articles of furniture.

It is another object of this invention to effect the assembling of tubular elements so as to leave on the finished article no visible sign of the assembly operation.

It is yet another object of the invention to provide a tube-joining element which permits, for example, three tubes disposed along the three axes of spatial rectangular coordinates to be rigidly joined together.

It is a further object of the invention to enable tubes to be firmly connected without the use of specialized equipment, such as welding gear.

SUMMARY OF THE INVENTION

The present invention provides a tube joining element comprising support means which can be inserted longitudinally into a tube and having a surface to contact the internal surface of a tube, mounting means in said support and transverse with respect to the longitudinal axis of said tube, an arm member pivotally supported by said mounting means, the ends of said arm member being spaced in a direction along said longitudinal axis and extending in a direction away from said surface on said support means, wherein a first end of said arm member is capable of being inserted freely into the tube, if necessary by being retracted transversely of said longitudinal axis by free pivotal movement by the arm member into said support, the second end of said arm member having a profile which permits it to be inserted forceably into the tube by sliding against the end of said tube, wherein such insertion of said second end can press said second end transversely against the interior of said tube while simultaneously pressing said first end against the internal surface of said tube, whereby said tube can be held to said tube joining element by tight contact of the internal surface of said tube with said contact surface of the support and with the first and second ends of said arm member.

The present invention also provides a tube joining element which can be inserted longitudinally into two axially aligned tubes to hold the two tubes in an assembled position, comprising support means having a surface to contact the internal surfaces of the two tubes, mounting means in said tube and transverse with respect to the longitudinal axes of said tubes, and arm member pivotally supported by said mounting means, the ends of the arm member being spaced in a direction along said axes and extending in a direction away from said surface on said support means, wherein a first end of said arm member is capable of being inserted freely into a first of said tubes, if necessary by being retracted transversely of said axes by free pivotal movement of said arm member, the second end of the arm member having a profile which permits it to be inserted forceably into the second tube by sliding against the end thereof, wherein said insertion can cause said second end to be pressed transversely against the interior surface of the second tube while the first end of the arm member is pressed against the internal surface of the first tube, whereby the two tubes can be held to the element by tight contact of the first and second ends of the arm member with the internal surfaces of the first and second tubes respectively and by close contact of said contact surface of the support with the internal surfaces of the two tubes.

In accordance with one embodiment of the invention, the second end of the arm member has a face which is inclined with respect to the longitudinal axis of the or each tube, for facilitating the gradual insertion of the arm member into the corresponding tube by sliding against the end of a tube when the joining element is forcibly pressed thereinto.

It is of advantage for the configuration of at least one of the two ends of the arm member to have a sharp edge to engage the internal surface of a tube once the assembly operation is completed.

The support preferably has a contact surface which is ribbed, knurled, covered with abrasive, or provided with any other suitable detent means to increase the coefficient of friction thereof and to strengthen its contact with the internal surface of the associated tube.

The various components used, tubes, supports and arm members, are made of any suitable material, metal, plastics material or the like.

DESCRIPTION OF PREFERRED EMBODIMENTS.

Further features and advantages of the invention will be apparent from the following description relating to embodiments selected by way of example and illustrated, and from the accompanying drawings, in which:

FIG. 1 shows a perspective view of a rigid assembly comprising three tube joining elements according to the invention;

FIG. 2 is a cross-section taken along the line II-II of FIG. 1;

FIG. 3 is a longitudinal section of a tube fixed to a joining element according to the invention;

FIG. 4 shows an alternative embodiment.

In FIG. 1, a block 1 of cubic shape is rigidly secured to or formed integrally with three supports 2, 3 and 4 of tube joining elements according to the invention. The supports are similar to each other and are mutually perpendicular. For the sake of clarity, only one element will be referred to in detail. In particular, the support 4 is a tubular member of square or rectangular section, having a longitudinal slot 6 in one of its walls 5. Two walls 7 and 8 of the support 4, which are adjacent to the slotted wall, have on their internal faces bosses 9 and 10 respectively. The bosses 9 and 10 support a pin 12 on which is pivoted an arm member 11. The pin 12 extends transversely with respect to the longitudinal axis ZZ' of the tubular member 4.

The arm member 11 has two ends 13 and 14 which are directed away from wall 15 of the support 4 and which are inclined with respect to the axis ZZ' to facilitate insertion of the ends 13 and 14 into a tube T extending in the direction of the axis ZZ'. The ends 13 and 14 of the member 11 slide against the end S of the tube during insertion.

When the element is inserted into the tube T, the first end 13 of the arm member 11 passes freely into the tube without effort. Then, the end S of the tube engages the inclined face of the second end 14 and forces it towards the interior of the support. The effect of this is to press the sharp edge 16 of the end 13 firmly against the internal surface of the tube T. Finally, as shown in FIG. 3, the tube T is held on the element by tight contact of the ends 13 and 14 of the arm member and the tube T is made by their respective sharp edges 16 and 17.

In the embodiment shown in FIG. 4, which is for connecting two axially aligned tubes T1 and T2 a support is formed by two angle members 18 and 19 with their respective limb portions 20 and 21. The limb portions 20 and 21 have external faces facing each other, between which is mounted an arm member 11'. Two other limb portions 22 and 23 of the two angle members 18 and 19 respectively are co-planar and thus form a contact surface to contact the internal surfaces of two tubes T1 and T2. The arm member 11' is mounted between the limb portions 20 and 21 on a pin 12' and has one end 13' similar to the end 13 of the above described embodiment while its other end 14' is inclined in the opposite sense to the end 14 of the above described embodiment.

To join the two tubes T1 and T2 together, the element is inserted into the tube T1, the end 13' of the arm member being retracted into the element without effort in a direction transverse to the axis ZZ' of the two tubes. The opposite end of the element is then inserted into the tube T2. The end 14' slides against the end S of the second tube and is displaced transversely towzards the axis ZZ', while forcing the end 13' against the internal surface of the first tube T1. Insertion is continued until the respective end faces of the two tubes T1 and T2 abut against each other. The tubes are then strongly held together by the close contact of their two internal surfaces with the contact surface of the limb portions 22 and 23 and with the ends 13' and 14' of the arm member 11'.

In these two embodiments, the external surface of the tube or tubes remains intact and shows no visible signs of the assembly operation.

As indicated above, the contact surface of the support 4 or 18, 19 which comes into contact with the respective tube can be treated in any suitable manner in order to increase its co-efficient of friction.

The elements can be formed of any suitable material and can be used to greatest effect to connect tubes formed of plastics material. The elements preferably have an arm member made of steel.

Obviously, the invention is in no way limited to the embodiments described and illustrated which are given only by way of example. Thus, the arrangements according to the invention can be applied to tubes or tubular elements of a section other than square or rectangular.

I claim:

1. A joining element having a body with an axis for axial insertion into tube means, said body having contact means for bearing against a first inner surface portion of said tube means and an arm member pivotally mounted thereon with two ends spaced along the axis of the body on either side of the pivoting point for engaging a second inner surface portion of the tube means transversely opposite said first surface portion and insertable in succession into the tube means, the end first inserted into the tube means being freely receivable therein, while the second end inserted is only forceably receivable into the tube means when the first end is inserted with the contact means bearing against the first surface portion, whereby the second end tightly engages said second surface portion and produces by lever action through the arm member tight engagement of the first end with the second surface portion and forces said contact means against said first surface portion.

2. An element for joining first and second tube means end to end having a body with an axis for axial insertion partly in said first tube means and partly in said second tube means, said element including contact means with first and second portions for engaging respectively said first and second tube means at the inner surfaces thereof, an arm member pivotally mounted on said body with two ends spaced along the axis of the body on either side of the pivoting point and located relative to said body axis transversely opposite said contact means and insertable in succession in said tube means, the arm end first inserted being freely receivable in the first tube means while the second arm end inserted is only forceably receivable in the second tube means when said first and second contact means portions are in engagement respectively with the inner surfaces of said tube means, whereby the second end tightly engages the inner surface of said second tube means and causes by lever action through the arm member the first inserted arm end to tightly engage the inner surface of said first tube means thereby forcing said contact means against the inner surfaces of both tube means.

3. The element of claim 1 wherein the second end inserted has a face which is inclined in respect to said axis in a direction to facilitate insertion by force of said second end in a tube means by sliding of said face against the end of said tube means.

4. The element of claim 1 wherein a said arm member end has a sharp angled contact edge for engaging the inner surface of a said tube means.

5. the element of claim 1 wherein the second end inserted has a leading portion consisting of a face which is inclined in respect to said axis in a direction to facilitate insertion by force of said second end in a tube means by sliding of said face against the end of said tube means, and a tail portion provided with a sharp angled contact edge for engaging the inner surface of said tube means.

6. The element of claim 1 wherein said tube means includes a tube section of uniform cross-sectional shape.

7. The element of claim 2 wherein the second end inserted has a face which is inclined in respect to said axis in a direction to facilitate insertion by force of said second end in a tube means by sliding of said face against the end of said tube means.

8. The element of claim 2 wherein a said arm member end has a sharp angled contact edge for engaging the inner surface of a said tube means.

9. The element of claim 2 wherein the second end inserted has a leading portion consisting of a face which is inclined in respect to said axis in a direction to facilitate insertion by force of said second end in a tube means by sliding of said face against the end of said tube means, and a tail portion provided with a sharp angled contact edge for engaging the inner surface of said tube means.

10. The element of claim 2 wherein said tube means includes a tube section of uniform cross-sectional shape.

11. A joining device for a tube-frame construction comprising a plurality of joining elements according to Claim 10 rigidly assembled to each other with the said axes thereof extending at an angle relatively to each other.

12. A joining device for a tube-frame construction comprising a central block with three joining elements rigidly fixed thereto and extending therefrom, each joining element having a body with an axis for axial insertion into tube means, said body having contact means for bearing against a first inner surface portion of said tube means and an arm member pivotally mounted thereon with two ends spaced along the axis of the body on either side of the pivoting point for engaging a second inner surface portion of the tube means transversely opposite said first surface portion and insertable in succession into the tube means, the end first inserted into the tube means being freely receivable therein, while the second end inserted is only forceably receivable into the tube means when the first end is inserted with the contact means bearing against the first surface portion, whereby the second end tightly engages said second surface portion and produces by lever action through the arm member tight engagement of the first end with the second surface portion and forces said contact means against said first surface portion.

* * * * *